(No Model.)
C. E. BUELL.
MEANS FOR UTILIZING SECONDARY BATTERIES ON TELEPHONE CIRCUITS.
No. 251,181. Patented Dec. 20, 1881.
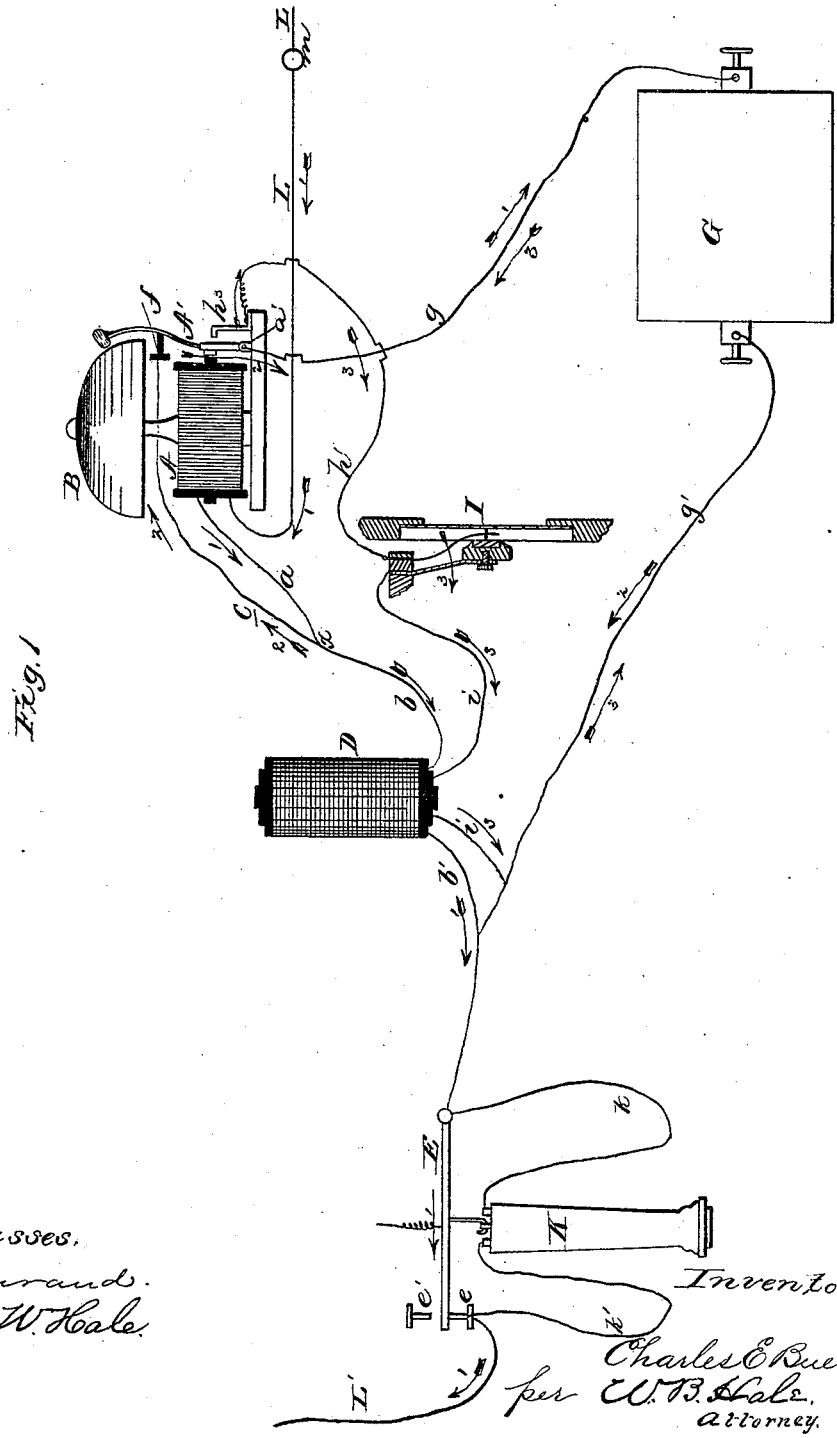

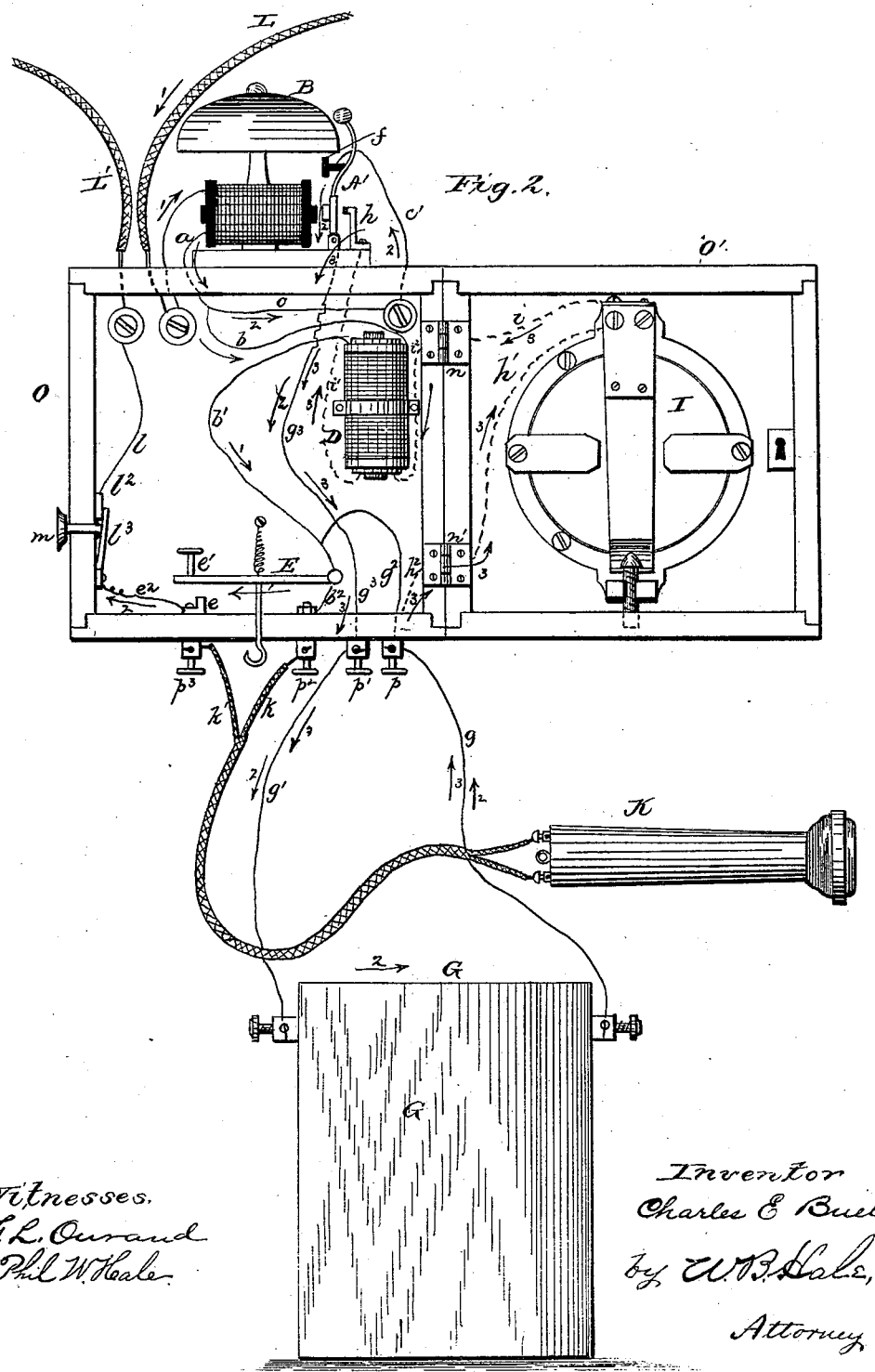

(No Model.)  3 Sheets—Sheet 3.
C. E. BUELL.
MEANS FOR UTILIZING SECONDARY BATTERIES ON TELEPHONE CIRCUITS.
No. 251,181.  Patented Dec. 20, 1881.
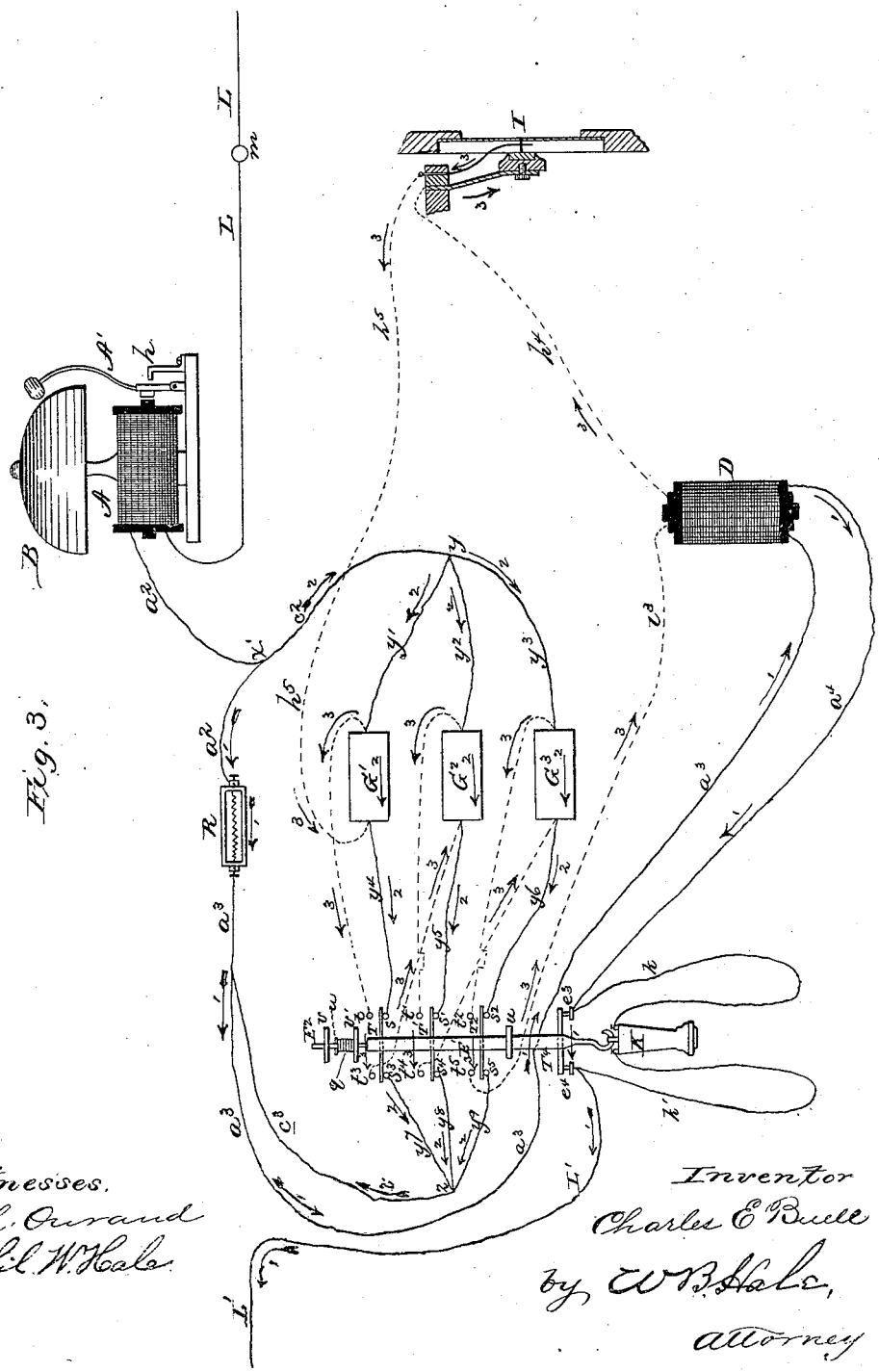

UNITED STATES PATENT OFFICE.

CHARLES E. BUELL, OF NEW HAVEN, CONNECTICUT, ASSIGNOR OF TWO-THIRDS TO JAMES G. SMITH, OF HACKENSACK, NEW JERSEY, AND GEORGE W. COY, OF MILFORD, CONNECTICUT.

MEANS FOR UTILIZING SECONDARY BATTERIES ON TELEPHONE-CIRCUITS.

SPECIFICATION forming part of Letters Patent No. 251,181, dated December 20, 1881.

Application filed August 31, 1881. (No model.)

*To all whom it may concern:*

Be it known that I, CHARLES E. BUELL, a citizen of the United States of America, residing at New Haven, in the county of New Haven and State of Connecticut, have invented certain new and useful Improvements in Means for Using Secondary Batteries on Telephonic Circuits; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to means for storing electrical energy from a main circuit and utilizing said stored energy upon another and independent circuit, its main object being to obviate the use of local electric generators for providing the inducing-currents for telephonic transmitters, and to enable the efficient use of secondary electric batteries for this purpose. The invention, however, may be used for other purposes, as will hereinafter appear.

The invention consists broadly in the combination, with a primary or main electric circuit, of a derived or branch circuit including one or more secondary electric batteries, and devices for disconnecting the derived or branch circuit from the primary or main circuit and connecting said branch or derived circuit to form a part of an independent circuit arranged to receive the charge of said secondary battery or batteries, whereby a normally-charged primary or main circuit may be used for other purposes, and at the same time be utilized for charging a secondary battery or batteries for use upon another circuit.

It also consists in the combination, with the main electric circuit and a branch or derived circuit emanating therefrom, of one or more secondary electric batteries in said branch or derived circuit, an electro-motive device arranged to influence the main circuit, and means for connecting said branch or derived circuit and secondary electric battery or batteries operatively with said electro-motive device, whereby the current of said battery or batteries may be caused to control said device.

It also consists in the combination, with the main telephone-line and an induction transmitting apparatus connected therewith, of a branch or derived circuit including a secondary electric battery and means for operatively connecting said secondary electric battery with the primary circuit of said transmitting apparatus, whereby the secondary battery may be used in lieu of the local electric generator heretofore used for producing the inducing-current of an induction telephonic transmitter.

It further consists in the combination, with a main telephone-circuit and an induction transmitting apparatus connected therewith, and a branch or derived circuit emanating from said main circuit, of a series of secondary electric batteries, devices for connecting said series of secondary batteries in multiple arc in said branch or derived circuit, and devices for breaking said branch or derived circuit and connecting said secondary batteries in tension series with the primary circuit of the induction transmitting apparatus.

In order that a sufficient proportion of the current for properly charging the secondary battery may be diverted over the branch or derived circuit, I so arrange a suitable resistance in the main line that when the current divides a part will flow over said resistance and a part will flow through the secondary battery in proportion to its resistance. The resistance interposed in the main line serves as a limit to the charging of the secondary battery, for when the latter has become charged to a point where back-flow would otherwise commence the main circuit will flow entirely over the resistance in the main line. It will be readily understood that were the secondary battery in the main line it would be liable to become overcharged, so that its current would oppose and neutralize the main current; but with the secondary battery in a derived or branch circuit, should it become charged to the point of back-flow, its current will simply join with the main current and pass off over the main line in the same direction therewith.

In the accompanying drawings, Figure 1 illustrates the construction of a telephone-station apparatus according to my invention. Fig. 2 is a view in elevation of a substantially similar apparatus inclosed in casings. Fig. 3 is a diagram illustrating a modified form of the apparatus in which a series of secondary batteries is used.

Referring to Fig. 1, letter L designates one of the main-line terminals entering the station and connected with one of the terminals of the coil of the bell-magnet A, from the other terminal of which leads a wire, $a$, which is connected with a metallic stop, $f$, by a wire, $c$, and with the secondary circuit of an induction-coil, D, by a wire, $b$, the opposite terminal of said secondary circuit being connected by a wire, $b'$, with the pivoted arm E, which supports the telephone when not in use, and at such time has its free end resting upon a metallic stop, $e$, with which is connected the main-line terminal L'. From the pivoted end of this arm E a wire, $k$, leads to one of the binding-posts of the receiving-telephone K, and from its other binding-post a wire, $k'$, leads to the metallic stop $e$. An insulated stop, $e'$, limits the upward movement of the arm E when it is raised by a spring in the ordinary manner.

The metallic bell-lever A' is pivoted at its lower end to a metallic stud, $a'$, from which a wire, $g$, leads to one of the poles of a secondary electric battery, G, the other pole of which is by a wire, $g$, connected with the wire $b'$ between the induction-coil and the telephone-supporting arm.

From the connections now described it will be observed that the main-line circuit is completed in the direction indicated by the arrows No. 1 from the main-line terminal L, through the coil of the bell-magnet, and thence over wires $a$ $b$, the secondary circuit of the induction-coil D, wire $b'$, metallic telephone-supporting arm E, and metallic stop $e$, to the other main-line terminal, L'; and it will also be observed that the secondary battery G, when the bell-lever is attracted against the metallic stop $f$, is included in a derived circuit indicated by the arrows No. 2, and formed by the wire $c$, stop $f$, bell-lever A', wire $g$, leading to one pole of the secondary battery, and the wire $g'$, leading from the other pole of said battery. Two paths for the main current through the station are thus provided, and it will therefore divide at the point marked $x$, one portion flowing, as indicated by the arrows No. 1, through the secondary circuit of the induction-coil, and the other portion flowing, as indicated by the arrows No. 2, over the derived circuit and through the secondary battery G, charging the said battery with electrical energy, which at the proper time is directed through the primary circuit of the induction-coil D, and utilized by means of suitable tension-varying devices for producing induced pulsations, which flow from the secondary circuit of the induction-coil over the main line in the transmission of articulate speech or other sounds.

The means of disconnecting the derived or branch circuit from the main circuit and directing its current over the primary circuit of the induction-coil are as follows: From a metallic stop, $h$, located behind the bell-lever, a wire, $h'$, leads to one of the tension-varying contacts of a transmitting apparatus, the diaphragm of which is indicated by the letter I, and which may be of any ordinary construction, requiring therefore no detailed description here. From the other contact of the transmitting apparatus a wire, $i$, leads to one terminal of the primary circuit of the induction-coil, and from its other terminal a wire, $i'$, leads to the wire $g'$. Now when, after the usual calls, two stations are put into communication, and also when a station desires to communicate by telephone with a central office, the main battery is taken temporarily off the line, and the bell-magnet A being thus discharged, its lever A' falls back against the metallic stop $h$, thus breaking the derived or branch circuit and closing the discharging-circuit of the secondary battery, as indicated by the arrows No. 3—that is, over wire $g$, metallic stop $h$, wire $h'$, the tension-varying devices of the transmitter, wire $i$, the primary circuit of the induction-coil, wire $i'$, and wire $g'$, back to the secondary battery. When sounds are produced by articulate speech or other means in front of the diaphragm I, the vibrations of said diaphragm will operate the tension-varying devices in the ordinary manner, and the resulting variations of the current of the secondary battery flowing through the primary circuit of the induction-coil will produce the induced pulsations or undulations which flow from the secondary circuit of said coil over the main line, resulting in the transmission of sounds corresponding to those acting upon the transmitter-diaphragm.

It will be seen that in a station apparatus constructed as described the secondary electric battery takes the place of the local generating-battery heretofore used, and is far preferable, in that its current is much stronger and more uniform. It is more cleanly and requires scarcely any attention after being once properly connected.

In Fig. 2 the apparatus varies from that shown in Fig. 1 only in unimportant particulars, adapting it to be inclosed in a casing, (indicated by the letter O,) which has its door O' open in the present instance to show the interior parts.

The diaphragm I and the circuit-varying devices are arranged upon the door in the usual manner, and the wires $i$ and $h'$ lead respectively from the circuit-varying contact to the upper and lower metallic hinges, $n$ and $n'$, of the casing. The wire $h'$ is connected, through the lower hinge, a wire, $h^2$, and binding-post $p$, with the wire $g$, which leads to one pole of the secondary battery G, and wire $i$ is connected, through the upper hinge and a wire, $i^2$, with one terminal of the primary circuit of the induction-coil D, from the other terminal of which the wire $i'$ leads to the stop $h$ behind the bell-lever. When the lever falls back the discharging-circuit of the secondary battery is established, as indicated by arrows No. 3—that is, over wire $g$, binding-post $p$, wire $h^2$, hinge $n'$, wire $h'$, the circuit-varying contacts, (not seen in this figure,) wire $i$, hinge $n$, wire $i^2$, the primary circuit of the induction-coil, wire $i'$, stop $h$, bell-lever $A'$, wire $g^3$, binding-post $p'$, and wire $g'$, back to the secondary battery.

When the station apparatus is not in use the current flows over the main line, as indicated by the arrows No. 1, and over the derived circuit, as indicated by the arrows No. 2—that is, following arrows No. 1 from the main-line terminal L, over wire $l$, through the coil of the bell-magnet, over wire $a$, wire $b$, the secondary circuit of the induction-coil, over wire $b'$, lever E, metallic stop $e$, wire $e^2$, circuit-breaking spring $l^3$, plate $l^2$, and wire $l'$, to the main-line terminal $L'$. Dividing at the point marked $x$, a portion of the current flows over the wires $c$ $c'$, stop $f$, bell-lever $A'$, wire $g^3$, binding-post $p'$, wire $g'$, through the battery G, over wire $g$, binding-post $p$, wire $g^2$, to wire $b'$ and the lever E, this being the derived or branch circuit, as indicated by the arrows No. 2. The lever $E'$, when held against the lower stop, $e$, short-circuits the telephone K; but when the lever is against the upper stop the current flows from the secondary circuit of the induction-coil over the wires $b'$ $b^2$ and binding-post $p^2$ to the telephone-wire $k$, through the telephone-coil, and over wire $k'$ to the binding-post $p^3$, and thence to the main line over the connections heretofore described.

In modification shown in Fig. 3 I have provided for using a series of secondary batteries, connecting them in multiple arc in the derived circuit for the purpose of being charged, and connecting them in tension series with the primary circuit of the induction-coil by means of suitable switching devices when the transmitting apparatus is to be used. In this case the main-line terminal L is connected with one terminal of the coil of the bell-magnet, from the other terminal of which a wire, $a^2$, leads to a resistance, R, from the opposite end of which a wire, $a^3$, leads to one terminal of the secondary circuit of the induction-coil D, from the other terminal of which a wire, $a^4$, leads to the metallic stop $e^3$, from which a wire, $k$, leads to one binding-post of the telephone K, while from the other binding-post the wire $k'$ leads to a similar metallic stop, $e^4$, with which is connected the main-line terminal $L'$.

From the wire $a^2$ a wire, $c^2$, leads to a point, $y$, where it is connected with three branches, $y'$, $y^2$, and $y^3$, which lead respectively to the poles of the secondary batteries $G'$, $G^2$, and $G^3$, from the opposite poles of which the wires $y^4$, $y^5$, and $y^6$ lead to metallic stops $s$, $s'$, and $s^2$. From similar metallic stops, $s^3$, $s^4$, and $s^5$, wires $y^7$, $y^8$, and $y^9$ lead to a wire, $c^3$, which joins with the wire $a^3$, between the resistance R and the induction-coil.

The letter $E'$ indicates a vertical telephone-supporting bar provided with a hook at its lower end, and arranged to slide vertically in suitable guides, as at $u$. From the upper end of said bar extends a pin, $E^2$, through perforations in the guide-plates $v$ and $v'$, the former being arranged at a suitable distance above the latter. Upon the plate $v'$ rests the lower end of a spiral spring, $q$, the upper end of which bears against the pin $w$, arranged through the pin $E^2$. When the telephone is not upon its hook this spring raises the telephone-supporting bar; but the weight of the telephone depresses said bar, which is made of non-conducting material, so that the cross-springs of metal, T, $T'$, and $T^2$, which are arranged through said bar, will have their ends brought in contact with the metallic stops $s$ and $s^3$, $s'$ and $s^4$, and $s^2$ and $s^5$, respectively, as shown in the drawings, and at the same time a metallic cross-bar, $T^4$, passing through the arm E, will have its ends brought in contact with the stops $e^3$ and $e^4$, respectively. When the parts are in this position the main-line current will divide at the point marked $x'$, this being the junction of the wire $c^2$ with the wire $a^2$, and a portion of the current will take the route indicated by the arrows No. 1—that is, over the wire $a^2$, resistance R, wire $a^3$, secondary circuit of the induction-coil, wire $a^4$, stop $e^3$, cross-bar $T^4$, stop $e^4$, and thence off over the main line. Another portion of the current will flow over the derived circuit indicated by the arrows No. 2—that is, over the wires $c^2$ to the point marked $y$, where it will again divide and flow over the branch wires $y'$, $y^2$, and $y^3$, through the secondary batteries $G'$, $G^2$, and $G^3$, and thence over the wires $y^4$, $y^5$, and $y^6$, stops $s$, $s'$, and $s^2$, the cross-springs T, $T'$, and $T^2$, stops $s^3$, $s^4$, and $s^5$, and wires $y^7$, $y^8$, and $y^9$, to their junction with the wire $c^3$ at the point marked $z$, from whence the reunited derived current flows to the wire $a^3$, joining the other portion of the main current. By this arrangement it will be perceived that the secondary batteries are connected in multiple arc with the derived circuit, and will be charged by the current flowing thereover, the resistance R causing a sufficient portion of the main current to be diverted over the derived circuit for this purpose. This resistance also serves as a measure of the extent to which the secondary batteries will become charged, as when said batteries have become charged to a predetermined point their resistance will cause the entire main current to pass over the resistance R. When, now, the station as now described is connected with another for the purpose of telephonic communication, the secondary batteries are to be disconnected from the derived circuit and connected in tension series with the primary circuit of the induction-coil D, and this is accomplished by the following means, viz: Immediately over the metallic stops $s$ to $s^5$ are arranged similar metallic stops, $t$ to $t^5$. From the metallic stops $t$, $t'$, and $t^2$ wires (indicated by dotted lines) lead respectively to similar poles of the secondary batteries $G'$, $G^2$, and $G^3$, and from the opposite poles of the secondary batteries $G^2$ $G^3$ wires (also indicated by dotted lines) lead to the stops $t^3$ and $t^4$, the stop $t^5$ being connected by a wire, $i^3$, with the primary circuit of the induction-coil D, from the opposite terminal of which a wire, $h^4$, leads to one of the tension-varying contacts of the transmitter, while from the other of said contacts a wire, $h^5$, leads to that pole of the battery G' opposite the one connected with the stop $t$. Now, when the telephone is taken off its hook the spring $q$ raises the bar E', carrying the cross-springs T, T', and T² out of contact with their lower stops and into contact with the upper stops, designated by the numbered letters $t$, thus breaking the derived circuit and connecting the secondary batteries in tension series with the primary circuit of the induction-coil, the current of said batteries then flowing as indicated by the arrows No. 3—that is, from battery G' to the stop $t$, over cross-spring T, to the stop $t^3$, and thence to the opposite pole of the battery G², from whence it flows by a similar route to battery G³, and from this last battery to stop $t^5$, and thence over wire $i^3$ to the primary circuit of the induction-coil, over the wire $h^4$, through the tension-varying devices of the transmitter, and back over wire $h^5$ to battery G'. It will thus be seen that a very powerful current is passed over the primary circuit of the induction-coil, and may be varied in the ordinary manner by producing sounds in front of the diaphragm I, causing vigorous induced pulsations or undulations of electricity to pass over the main circuit.

It will be obvious that instead of being directed over the primary circuit of an induction apparatus the current of the secondary battery or batteries might be directed upon any other suitable circuit, and caused to operate any desired electrical apparatus capable of operation by such electrical currents as are furnished by this class of batteries.

I do not herein claim the matter embraced in the two following clauses, as the same is made the subject of claims in another pending application filed by me June 6, 1881—that is to say, first, a telephone-station apparatus provided with a transmitter having its secondary circuit arranged for connection with a main line in a manner to become charged by an electric current flowing over said main line, and means for directing the current of said secondary electric pile or battery over the primary circuit of the transmitter; secondly, a line-wire provided at one end with a line-battery or electric-current generator, in combination with a secondary cell arranged upon said line and adapted to store up electricity upon the passage of the main-line current through it; a local circuit in circuit with said secondary cell, and a transmitter in said local circuit.

Having now fully described my invention and explained the operation thereof, I claim—

1. The combination, with a primary or main electric circuit, of a derived or branch circuit including one or more secondary electric batteries, and devices for disconnecting the derived or branch circuit from the primary or main circuit and connecting said branch or derived circuit to form a part of an independent circuit arranged to receive the charge of said secondary battery or batteries, whereby a normally-charged primary or main circuit may be used for other purposes, and at the same time be utilized for charging a secondary battery or batteries for use upon another circuit.

2. The combination, with the main electric circuit and a branch or derived circuit emanating therefrom, of one or more secondary electric batteries in said branch or derived circuit, an electro-motive device arranged to influence the main circuit, and means for connecting said branch or derived circuit and secondary electric battery or batteries operatively with said electro-motive device, whereby the current of said battery or batteries may be caused to control said device.

3. The combination, with the main telephone-line and an induction transmitting apparatus connected therewith, of a branch or derived circuit including a secondary electric battery and means for operatively connecting said secondary electric battery with the primary circuit of said transmitting apparatus, whereby the secondary battery may be used in lieu of the local electric generator heretofore used for producing the inducing-current of an induction telephonic transmitter.

4. The combination, with a main telephone-circuit and an induction transmitting apparatus connected therewith, and a branch or derived circuit emanating from said main circuit, of a series of secondary electric batteries, devices for connecting said series of secondary batteries in multiple arc in said branch or derived circuit, and devices for breaking said branch or derived circuit and connecting said secondary batteries in tension series with the primary circuit of the induction transmitting apparatus.

In testimony whereof I affix my signature in presence of two witnesses.

CHARLES E. BUELL.

Witnesses:
GEO. M. LOCKWOOD,
H. C. HUNTEMANN.